(12) United States Patent
Hadas et al.

(10) Patent No.: US 11,086,649 B2
(45) Date of Patent: Aug. 10, 2021

(54) MINIMIZING DOWNTIME OF HIGHLY AVAILABLE VIRTUAL MACHINES

(71) Applicant: Red Hat, Inc., Raleigh, NC (US)

(72) Inventors: Arik Hadas, Raanana (IL); Daniel Erez, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 210 days.

(21) Appl. No.: 16/513,888

(22) Filed: Jul. 17, 2019

(65) Prior Publication Data
US 2021/0019161 A1     Jan. 21, 2021

(51) Int. Cl.
  *G06F 9/455* (2018.01)
  *G06F 16/907* (2019.01)

(52) U.S. Cl.
  CPC ...... *G06F 9/45545* (2013.01); *G06F 9/45558* (2013.01); *G06F 16/907* (2019.01); *G06F 2009/4557* (2013.01); *G06F 2009/45583* (2013.01)

(58) Field of Classification Search
  CPC .................................................. G06F 9/45545
  USPC .............................................................. 718/1
  See application file for complete search history.

(56) References Cited

U.S. PATENT DOCUMENTS

| | | | |
|---|---|---|---|
| 6,880,051 B2 * | 4/2005 | Timpanaro-Perrotta | G06F 11/1448 707/999.202 |
| 8,447,826 B1 * | 5/2013 | Manmohan | G06F 11/2033 709/214 |
| 8,769,226 B2 * | 7/2014 | Wilk | G06F 11/1484 711/162 |
| 8,850,130 B1 * | 9/2014 | Aron | G06F 3/0641 711/150 |
| 9,223,606 B1 * | 12/2015 | Vaidya | G06F 9/45558 |
| 9,817,739 B1 * | 11/2017 | Pise | G06F 11/3051 |
| 9,886,215 B1 * | 2/2018 | Ramachandran | G06F 3/065 |
| 9,996,378 B2 * | 6/2018 | North | G06F 11/0793 |
| 2008/0189468 A1 * | 8/2008 | Schmidt | G06F 11/2046 711/6 |
| 2010/0070978 A1 * | 3/2010 | Chawla | G06F 9/5077 718/105 |

(Continued)

OTHER PUBLICATIONS

"SAP HANA Large Instances High Availability and Disaster Recovery on Azure", 2019, GitHub Inc., https://github.com/MicrosoftDocs/azure-docs/blob/master/articles/virtual-machines/workloads/sap/hana-overview-high-availability-disaster-recovery.md, 4 pages.

(Continued)

*Primary Examiner* — Mehran Kamran
(74) *Attorney, Agent, or Firm* — Lowenstein Sandler LLP (57) ABSTRACT

Implementations for prioritized execution of highly available virtual machines for minimizing downtime of the highly available virtual machines are described. An example method may include accessing metadata identifying a plurality of virtual machines indicated as highly available virtual machines, determining, in view of the metadata, a number of highly available virtual machines of the plurality of virtual machines that are associated with each storage domain of a plurality of storage domains, and initiating, starting with a storage domain associated with a highest number of highly available virtual machines, execution of one or more highly available virtual machines associated with each of the plurality of storage domains in a sequential manner.

20 Claims, 6 Drawing Sheets

(56) References Cited

U.S. PATENT DOCUMENTS

| | | | | |
|---|---|---|---|---|
| 2012/0266166 A1* | 10/2012 | Farkas | | G06F 9/5077 |
| | | | | 718/1 |
| 2012/0278287 A1* | 11/2012 | Wilk | | G06F 11/1484 |
| | | | | 707/654 |
| 2012/0311603 A1* | 12/2012 | Kudo | | G06F 3/0635 |
| | | | | 718/105 |
| 2013/0111468 A1* | 5/2013 | Davis | | G06F 9/5077 |
| | | | | 718/1 |
| 2013/0227567 A1* | 8/2013 | Horikawa | | G06F 9/45558 |
| | | | | 718/1 |
| 2014/0026000 A1* | 1/2014 | Ma | | H04L 69/40 |
| | | | | 714/47.1 |
| 2014/0059375 A1* | 2/2014 | Mcelhoe | | G06F 11/1484 |
| | | | | 714/4.1 |
| 2014/0344805 A1* | 11/2014 | Shu | | G06F 9/45558 |
| | | | | 718/1 |
| 2014/0365522 A1* | 12/2014 | Soundararajan | | G06F 16/28 |
| | | | | 707/770 |
| 2015/0355983 A1* | 12/2015 | Harper | | G06F 11/2046 |
| | | | | 714/4.11 |
| 2015/0378839 A1* | 12/2015 | Langouev | | G06F 11/1451 |
| | | | | 714/19 |
| 2016/0004552 A1* | 1/2016 | Innan | | H04L 67/1008 |
| | | | | 718/1 |
| 2016/0283145 A1* | 9/2016 | Han | | G11C 5/148 |
| 2017/0060620 A1* | 3/2017 | Sevigny | | G06F 11/1438 |
| 2017/0060707 A1* | 3/2017 | Harper | | G06F 11/2025 |
| 2017/0168907 A1* | 6/2017 | Harper | | G06F 11/2025 |
| 2017/0171019 A1* | 6/2017 | Nayak | | H04L 49/357 |
| 2017/0286146 A1* | 10/2017 | Voigt | | G06F 9/5027 |
| 2017/0371546 A1* | 12/2017 | Rivera | | G06F 3/0604 |
| 2018/0095776 A1* | 4/2018 | Tsai | | G06F 9/505 |
| 2018/0157561 A1* | 6/2018 | Venkatesh | | G06F 8/65 |
| 2018/0165166 A1* | 6/2018 | Wang | | G06F 11/203 |
| 2018/0295195 A1* | 10/2018 | Wei | | H04L 67/18 |
| 2018/0336106 A1* | 11/2018 | Cao | | G06F 9/45558 |
| 2019/0056877 A1* | 2/2019 | Kolesnik | | G06F 9/5072 |
| 2019/0258551 A1* | 8/2019 | Cors | | G06F 11/2038 |
| 2021/0011830 A1* | 1/2021 | Khokhar | | G06F 3/0689 |

OTHER PUBLICATIONS

"Deep Dive: Virtual Machine High Availability", Feb. 24, 2017, Platform9, https://platform9.com/blog/virtual-machine-high-availability-support/, 14 pages.

* cited by examiner

Metadata 230

Metadata 230

FIG. 3B

Primary SD – Backing SD
SD160A - SD160D
SD160B – SD160E
SD160C – SD160F

Storage Domain Mapping 310

FIG. 3C

SD ID – Number of HA VM
SD160D - 2
SD160E – 2
SD160F – 3

FIG. 3D

SD ID – Number of HA VM
SD160F - 3
SD160D – 2
SD160E – 2

MINIMIZING DOWNTIME OF HIGHLY AVAILABLE VIRTUAL MACHINES

TECHNICAL FIELD

The disclosure is generally related to virtualized computer systems, and more particularly, to prioritized execution of highly available virtual machines for minimizing downtime of the highly available virtual machines.

BACKGROUND

The virtualization of a data center results in an abstraction of a physical system to consolidate the data center infrastructure and increase operational efficiencies. A virtual machine (VM) may be a software-based emulation of computer hardware that may perform the same functions as physical machines. A virtual environment can include multiple host machines. A host machine may allocate a certain amount of its storage resources to each of a plurality of virtual machines. Each virtual machine is then able to use the allocated storage resources to execute applications, including operating systems (referred to as guest operating systems).

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Described herein is a system to prioritize execution of highly available virtual machines for minimizing downtime of the highly available virtual machines in a virtual environment. A highly available (HA) virtual machine (VM) is a virtual machine whose uptime should be maximized, or alternatively, whose downtime should be minimized. In particular, HA VM is typically restarted automatically when its process is interrupted. An interruption can occur when the virtual machine is terminated by methods other than shutting down within the guest operating system or from the administration portal of the virtual environment. When these events occur, the highly available virtual machine is automatically restarted. A VM can be designated as an HA VM by configuring the properties of the VM to indicate that it is an HA VM.

The virtual environment may include a plurality of host computer systems (also referred to herein as a "host") managed by a virtualization manager. When instantiating a VM on a host, a storage manager may define a number of storage domains that provide the host with access to a set of physical storage resources. Thus, the host may be communicatively coupled, via a network, to the set of physical storage resources (also referred to herein as a "storage devices") via the storage domains. "Storage domain" herein refers to an atomic storage unit, such as a mount point or a folder for a file based storage, or a group of logical unit numbers (LUNs) for a block-based storage. A storage domain may comprise one or more block devices, one or more storage devices, one or more file systems, one or more volumes, and/or portions thereof. The storage domains may be employed for storing one or more of the virtual disks or disk images for the VMs.

In some instances, a primary site may be setup with a data center that includes a first set of host computers, a first set of storage devices, and a first set of storage domains. A secondary site may also be setup with a data center that includes a second set of host computers (also referred to herein as "secondary hosts"), a second set of storage devices (also referred to herein as "secondary storage devices"), and a second set of storage domains (also referred to herein as "secondary storage domains"). In some scenarios, the data center in the secondary site may be utilized for backing up the data center in the primary site and restoring the operations of the system supported by the data center in the primary site. In some examples, a disaster may cause the operations of the primary site to fail and necessitate restoration of the system from the secondary site. A disaster can be anything that puts a system's operations at risk, such as a cyberattack, a device failure, a natural disaster, etc. The first set of storage devices may no longer be accessible to the first set of hosts due to various reasons. For example, a component associated with the first set of storage devices (e.g., a hardware disk) may have failed, the first set of hosts may no longer have access (e.g., access has been removed or blocked by a system administrator, a firewall, etc.) to the first set of storage devices, devices on the primary site may have crashed, etc. A replication of the data and definitions of logical entities (i.e., virtual machines, virtual disk, etc.) from the primary site can be stored on the second set of storage domains on the secondary site as backing storage domains. In the event of a disaster or loss of access of the storage devices to the hosts on the primary site, the system of the primary site can be restored from the backing storage domains.

Under conventional methods, the system of the primary site is typically restored in the same manner as setting it up as a new system. A new system can be setup following a hierarchical order, where higher level entities are setup first, then the next level entities are setup, and so on until the lowest level entities are all set up. In an example, in a virtual data center, a new system can be setup by first defining higher level entities such as data centers, then next level entities such as clusters (e.g., group of hosts), then storage domains, then storage disks, then virtual machine templates, and then virtual machines.

The conventional approach of restoring the system of the primary site in the same manner as setting up a new system provides the benefit of leveraging an existing procedure for configuring a new system and avoiding dependency conflicts for when one entity cannot be restored because it depends on another entity that was not restored yet. Restoration of the virtual data center in the secondary site using the conventional approach can include the process steps in the following order: 1) attaching (e.g., associating, connecting, coupling, mounting, etc.) each of the second set of storage domains to all of the hosts of the second set of hosts, 2) For each storage domain of the second set of storage domains, reading (e.g., inspecting) all logical entities associated with the storage domains, 3) registering each of the recovered virtual machine templates to the setup of the recovery tool, 4) registering each of the virtual machines to the setup of the recovery tool, 5) running (e.g., executing) each of the highly available VMs that ran before the primary site lost connection to the first set of storage domains or the disaster occurred, 6) running the remainder of the VMs that ran before the disaster. This can ensure the entire system is restored and running from the secondary site as quickly as possible.

An important aspect of a restoration process is to minimize the downtime of the highly available VMs that ran before the disaster. That is, the time it takes to have the HA VMs running again should be minimized so that the processes running on the HA VMs have minimal interruptions. Under the conventional approach, however, it can take a significant amount of time before reaching the step of running the HA VMs during the recovery process. For example, there can be numerous storage domains, hosts, templates, etc. and running the HA VM step comes after attaching all those storage domains to all those hosts, inspecting all the logical entities associated with all of those storage domains, registering all the VM templates and registering all the VMs. As a result, there can be an extended period of time before the HA VMs can be run and an extended period of downtime of the HA VMs and processes running on them.

Aspects of the disclosure address the above and other deficiencies by providing technology to prioritize execution of highly available virtual machines for minimizing downtime of the highly available virtual machines. In implementations of the disclosure, the technology disclosed herein may involve accessing metadata that identifies a plurality of VMs that are indicated as highly available VMs. For example, the metadata can be generated and/or updated after a change in the system of the primary site, such as, creation of a new VM, modifying a VM property, etc. The metadata can be stored on the secondary site in each of the secondary storage domains, in one particular storage domain in the secondary site, or on a source (e.g., a data source) that is separate from the storage domains altogether. Based on the metadata, the technology may determine a number of HA VMs that are associated with each storage domain of a plurality of storage domains. In one example, the plurality of storage domains may be sorted according to the number of HA VMs associated with each storage domain. For example, the storage domains may be sorted from the storage domain having the highest number of HA VMs to the storage domain having the lowest number of HA VMs.

The technology may then iterate through the sorted storage domains in the order of storage domain associated with the highest number of HA VMs to lowest number of HA VMs. For each storage domain, starting with the storage domain associated with the highest number of HA VMs, the storage domain may be attached to all host computers in the secondary site. The technology may provide for initiating execution of the HA VMs that are associated with each storage domain on one or more of the host computers in the order of storage domain associated with the highest number of HA VMs to lowest number of HA VMs. In this manner, a storage domain that has the highest number of HA VMs is prioritized among the plurality of storage domains, and then the next highest number of HA VMs are prioritized, and so on. This can ensure that the running of the highest number of HA VMs can take place before performing other steps involved with attaching all other storage domains to the hosts.

As such, the systems and methods described herein include technology that enhances efficiency of computing resources and minimizes downtime of computing resources. In particular, aspects of the disclosure provide technology that enhances the efficiency and/or performance of a computing system by prioritizing execution of highly available virtual machines so that important operations running on the HA VMs can be resumed very quickly in a disaster. This may enhance the efficiency and performance of the computer system by reducing the time it takes to start HA VMs when an emergency situation causes disruption of the system, compared to the conventional approach of attaching all storage domains to all hosts first and various other steps before running the HA VMs. Various aspects of the above referenced methods and systems are described in details herein below by way of examples, rather than by way of limitation.

Figure 1:
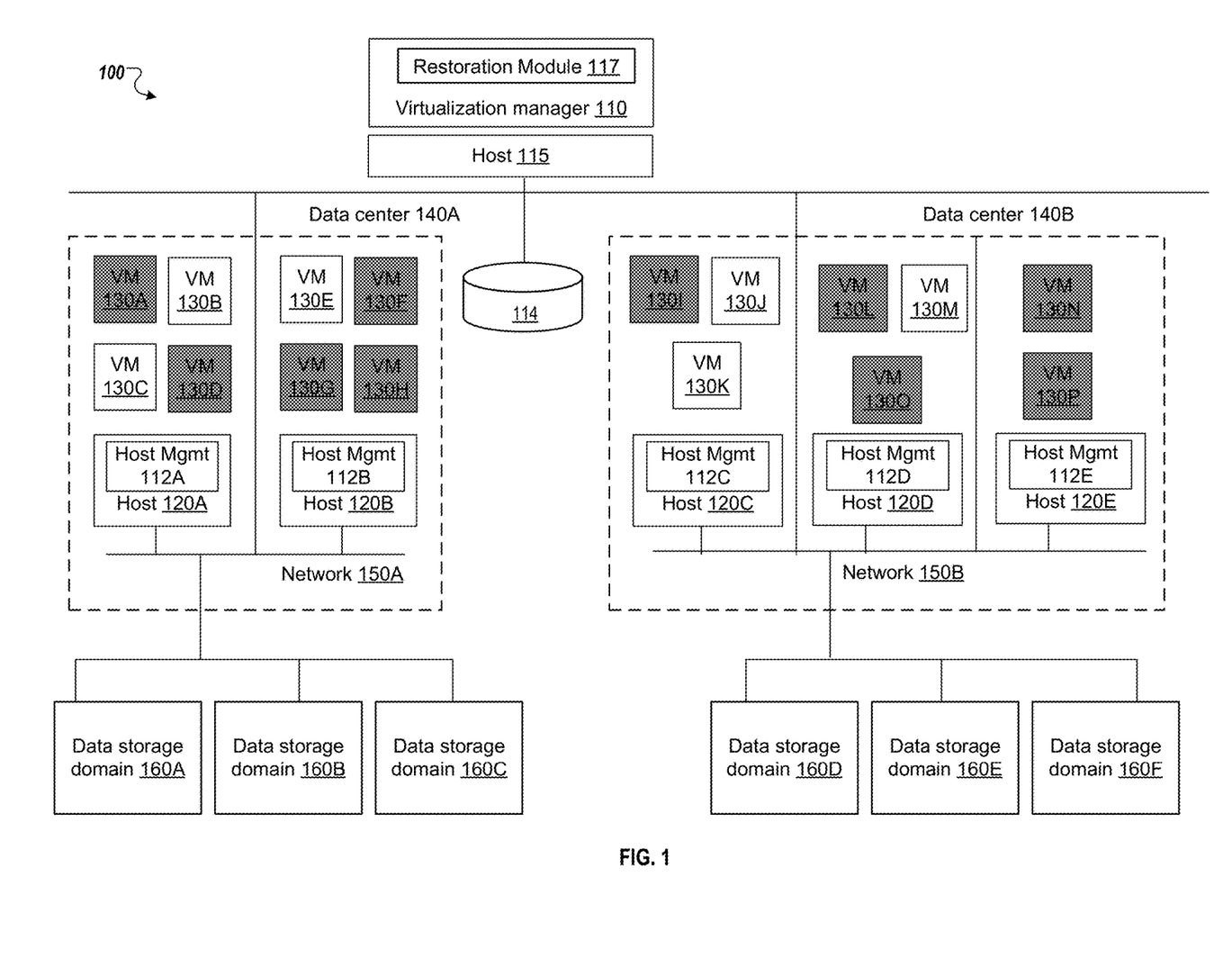
FIG. 1 depicts a high-level block diagram of an example computer system architecture, in accordance with one or more aspects of the disclosure.

FIG. 1 is a block diagram of a distributed computer system 100 representing an example of a virtualized environment. In the illustrative example of FIG. 1, computer system 100 comprises a virtualization manager 110 and a plurality of host computer systems 120A-120E grouped into one or more logical groups which may be also referred to as "data centers" 140A-140B. Virtualization manager 110 refers to one or more software modules being executed by a host computer system 115 for centralized management of the virtualized environment. Virtualization manager 110 may comprise various interfaces, including administrative interface, reporting interface, and/or application programming interface (API) to communicate to host computers 120A-120D of the managed virtualized environment, as well as to user portals, directory servers and various other components which are omitted from FIG. 1 for clarity.

In one implantation, the virtualization manager 110 may access a database 114, which may run on the host computer system 115 or in a separate database server (not shown). Database 114 may, e.g., be a relational database, an object-oriented database, an object-relational database, etc. The database 114 may store data, e.g., configurations, settings, and status related to VM host computer systems 120A-120E and references (e.g., IP addresses) of the data storage domains 160A-160F as well as other relevant information.

Each of the host computer systems 115, 120A-120E may comprise one or more processors communicatively coupled to memory devices and input/output (I/O) devices, as described in more details herein below with references to FIG. 6. Each of host computer systems 115, 120A-120E may run a plurality of virtual machines 130A-130P by executing a hypervisor to abstract the physical layer, including processors, memory, and I/O devices, and present this abstraction to the virtual machines as virtual devices.

Each of the virtual machines 130A-130P may execute a guest operating system which may utilize the underlying virtual devices, including virtual processors, virtual memory, and virtual I/O devices. One or more applications may be running on the virtual machines 130A-130P under the guest operating system. In the example of FIG. 1, virtual machines 130A, 130D, 130F, 130G, and 130H are designated as highly available virtual machines.

Each of the host computer systems 120A-120E may run a host management module 112A-112E that manages and monitors various aspects of the host operation, including the storage, memory and network interfaces. In an illustrative example, host management modules 112A-112E may be provided by a Virtual Desktop and Server Management (VDSM) daemon.

In certain implementations, host computer systems 120A-120E may be grouped into one or more logical groups which may be also referred to as "data centers" 140A-140B. A data center may represent the highest level of abstraction in the virtualization model. Each data center 140 may be communicatively coupled, via a network 150A-150B, to one or more storage domains, including data storage domains 160A-160F.

Storage domains 160A-160F may provide shared access to data storage space and may include block-based storage devices, file-based storage devices, or a combination thereof. Block-based storage devices may include one or more data storage devices (e.g., Storage Area Network (SAN) devices) and provide access to consolidated block-based (e.g., block-level) data storage. Block-based storage devices may be accessible over a network and may appear to an operating system of a host system as locally attached storage. File-based storage devices may include one or more data storage devices (e.g., Network Attached Storage (NAS) devices) and provide access to consolidated file-based (e.g., file-level) data storage that may be accessible over a network.

When instantiating a VM on a host, a storage domain may provide the host with access to a set of physical storage resources. One or more virtual disks (not shown) for virtual machines (e.g., VM130A-VM130P) may be defined within the storage domains (e.g., storage domains 160A-160F). For example, when instantiating a VM, a system administrator can indicate that the VM is to have 25 GB of storage. The 25 GB of storage from the storage domain can be allocated as a logical storage entity (e.g., a virtual disk). The VM can be instantiated on a host and the virtual disk may be associated with the VM, where the virtual disk is backed by the set of physical storage devices of the storage domain. The VM with associated virtual disk that reside on the storage domain providing the 25 GB of storage is said to be associated with the storage domain. The association (e.g., relationship) between VMs and storage domains may be a many to many relationship. A VM may be associated with a single storage domain (e.g., when VM storage is allocated from one storage domain) or multiple storage domains (e.g., when VM storage is allocated from two or more storage domains), and a storage domain may be associated with a single VM (e.g., when a storage domain allocates storage to one VM) or multiple VMs (e.g., when a storage domain allocates storage to two or more VMs).

In some implementations, the data center 140A may be located in a primary site and data center 140B may be located in a secondary site. In one example, each data center may have a separate virtualization manager. Data center 140B may be used to backup the data center 140A, and vice versa. There may be a one to one mapping between the storage domains in the primary site and the storage domains in the secondary site. In the example when data center 140B is used for backing up data center 140A, storage domains 160A-160C may be identified as primary storage domains and storage domains 160D-160F may be identified as backing storage domains. Storage domain 160D may be designated as backing storage domain for storage domain 160A, storage domain 160E may be designated as backing storage domain for storage domain 160B, storage domain 160F may be designated as backing storage domain for storage domain 160C, etc. The mapping between the primary and the backing storage domain may be referred herein as primary to backing storage domain mapping. In an implementation, the mapping may be stored in a data store (e.g., data store 114) on system 100. Each of the backing storage domains may store a replication of the data and definitions of logical entities (i.e., virtual machines, virtual disk, etc.) from a corresponding primary storage domain.

In some situations, the primary site may experience interruption or downtime. For example, host 120A-120B in data center 140A of the primary site may not have access to the storage domains 160A-160C. In another example, a component associated with the data center 140A in the primary site may have failed. In another example, the storage devices on the primary site may crash due to a disaster. In such instances, the system of the primary site can be restored using the backing storage domains (e.g., storage domains 160D-160F) on the secondary site. The mapping between the primary and backing storage domains are used to set up the logical entities (e.g., virtual machines) in the secondary site during the restoration process. That is, logical entities associated with primary storage domain 160A are set up using its backing storage domain 160D, logical entities associated with primary storage domain 160B are set up using its backing storage domain 160E, and so on. As such, the logical entities associated with primary storage domain 160A are also associated with backing storage domains 160D for the purposes of the restoration process. Thus, the primary to backing storage domain mapping is used to determine the logical entities that are associated with the backing storage domains during the restoration process. As shown in FIG. 1, virtual machines 130A-130H are referred to as virtual machines 130I-130P, respectively, when the virtual machines are restored on data center 140B. Accordingly, HA VMs 130A, 130D, 130F, 130G, and 130H of data center 140A are referred to as 130I, 130L, 130O, 130N, and 130P, respectively, in data center 140B of the secondary site.

Under conventional methods, the system supported by the data center 140A of the primary site would be typically restored using the data center 140B on the secondary site in the same manner as setting up a new system. Using the conventional approach, the restoration of the system would involve attaching each of the storage domains 160D-160F to each of the available hosts 120C-120E of the secondary site. That is, storage domain 160D would be attached to host 120C, 120D, and 120E, then storage domain 160E would be attached to host 120C, 120D, and 120E, and so on. It is noted that attaching a storage domain to a host may mean mounting the storage domain mount point to the host. For each of the storage domains 160D-160F, all logical entities associated with the storage domains would then be inspected. Then, all VM templates (not shown) associated with the storage domains 160D-160F would be registered. Then, all VMs (e.g., VMs 130I-130P) associated with the storage domains 160D-160F would be registered. At this point, the conventional restoration approach can involve running (e.g., executing) the HA VMs (e.g., HA VMs 130I, 130L, 130O, 130N, and 130P) that ran before the disaster occurred. As such, using the conventional approach, it can take a significant amount of time before reaching the step of running the HA VMs due to waiting for all storage domains to be attached and all other entities to be registered on all storage domains.

In accordance with one or more aspects of the disclosure, virtualization manager 110 may comprise a restoration module 117 to facilitate operations of the computer system 100 for restoration of a virtual data center (e.g., data center 140A or 140B) that prioritizes execution of the HA VMs. The functionally of the restoration module 117 can exist in a fewer or greater number of modules than what is shown, with such modules residing at one or more processing devices of computer system 100, which may be geographically dispersed. For example, restoration module 117 may run on any one or more of host 115, hosts 120A-120E. The module 117 may be operable in conjunction with virtualization manager 110 from which it may receive and determine relevant information regarding the data storage domains 160A-160F and any active virtual machines associated with those domains in the virtual environment. Thereupon, the restoration module 117 may restore a data center and prioritize the execution of HA VMs of the data center such that downtime of HA VMs and applications running on the HA VMs is minimized, as discussed in more detail below with respect to FIGS. 2 through 6.

Figure 2:
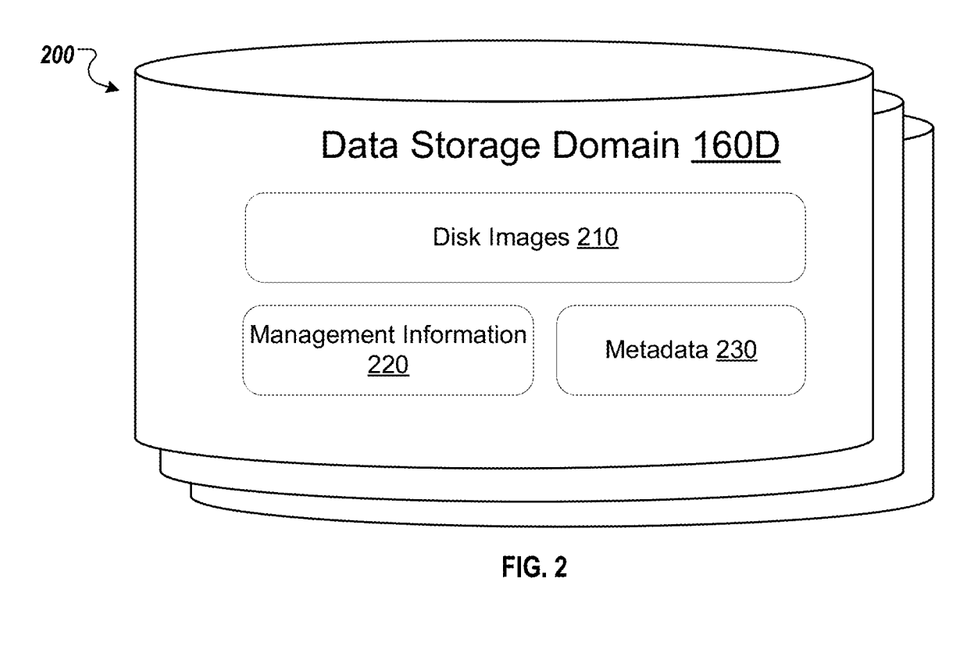
FIG. 2 depicts an example functional structure of a storage domain in accordance with one or more aspects of the disclosure.

FIG. 2 depicts an example functional structure of a storage domain in accordance with one or more aspects of the disclosure. An example functional structure 200 of a storage domain, such as data storage domain 160D of FIG. 1, is depicted. The functional structure 200 may be employed for storing one or more virtual machine disk images 210, management information 220, and metadata 230. In an illustrative example, example storage domain 160D may employ file-based storage, in which case disk images 210, management information 220, and metadata 230 are provided by respective files. In another illustrative example, example storage domain 160D may employ block-based storage, in which case disk images 210, management information 220, and metadata 230 are provided by respective logical volumes.

Each of the disk images 210 (also referred to as a virtual disk image) may comprise one or more data storage portions for storing disk image data. Each of the disk images 210 may store and organize information that may be loaded onto a machine (e.g., virtual machine or physical machine) and may be executed by the machine to provide a computing service. As discussed with reference to FIG. 1, storage domain 160D on data center 140B may be a backing storage domain of storage domain 160A on data center 140A. As such, disk images 210 may comprise replication of data stored on storage domain 160A to support one or more of virtual machines 130A-130H.

Management information 220 may comprise information that may be utilized for data volume identification, management, creation, modification, removal, and/or for performing data modification operations (e.g., file operations) with respect to the data stored on the disk images 210. Management information 220 may comprise description of the entities in the data center and relationships between entities, such as, definition (e.g., name, comment, etc.) of clusters, disks, virtual machines, templates used by virtual machines, associations (e.g., relationships) between storage domains to virtual machines, etc. Management information 220 may be stored on each of the backing storage domains 160D-160F for setting up the system of data center 140A on data center 140B.

Metadata 230 may be employed for identifying a plurality of virtual machines. In an example, the plurality of virtual machines may be virtual machines that have been designated as highly available virtual machines ("HA VM") in data center 140A. A VM is designated as an HA VM by configuring the properties of the VM to indicate that the VM is an HA VM. As such, the metadata 230 may identify the plurality of virtual machines that have been indicated as HA VMs. Metadata 230 may be used to prioritize execution of HA VMs that were running in the primary site for a restoration process of the system from the secondary site. Metadata 230 may be targeted specifically to focus on the HA VMs and stored separately from other data, such as disk images 210 or management information 220, so that during the restoration process, the restoration module can access it quickly without having to perform extensive search algorithms to identify the pertinent HA VM information out of a large amount of other data.

In an implementation, metadata 230 may be created and updated based on the virtual machine properties. Metadata 230 may be generated by inspecting the properties of each of the virtual machines 130A-130H in data center 140A and identifying those virtual machines where the properties indicate that the VMs are HA VMs. In some implementation, metadata 230 can be generated and/or updated after a change is detected in the system of the primary site, such as, creation of a new VM, modifying a VM property, adding a virtual disk, adding a network connection, etc. For example, referring back to FIG. 1, after VM 130H is created in data center 140A and its properties are set to indicate that it is an HA VM, metadata 230 may be updated to include VM 130H in the plurality of VMs identified in metadata 230. In another example, at one point, the properties of VM 130G may have been changed to designate the VM as an HA VM. After the change is made, metadata 230 may have been updated to include VM 130G in the plurality of VMs identified in metadata 230. In another example, at one point, the properties of VM 130E may have been changed to remove the HA VM designation for the VM. After the change is made, metadata 230 may have been updated to remove VM 130E from the plurality of VMs identified in metadata 230.

In an example, metadata 230 may be stored on each storage domain of the plurality of backing storage domains 160D-160F. That is, the same instance (e.g., copy, version) of metadata 230 may reside on each of the storage domains 160D-160F.

In one implementation, metadata 230 may include an identifier for each of the plurality of virtual machines identified in metadata 230. In another implementation, in addition to the identifier for each HA VM, metadata 230 may also include an identifier and/or location for one or more storage domains that are associated with each of the plurality of VMs indicated as HA VMs. Metadata 230 may indicate which of the one or more storage domains are associated with which of the HA VMs. Metadata 230 may be stored in various formats. For example, metadata 230 may be a text file, a comma separated file, an xml file, a database table, etc.

FIGS. 3A-3F depict an example of using metadata to prioritize execution of highly available virtual machines, according to one or more aspects of the disclosure. When the system of the primary site needs to be restored from the secondary site, metadata 230 may be used to prioritize running (e.g., execution) of the HA VMs that were running on the primary site prior to the need for restoration arose (e.g., disaster, loss of connection to storage domains, etc.). A restoration module may reside on one or more of the host computers of system 100 depicted in FIG. 1.

In some implementations, the restoration process may involve attaching (e.g., connecting, associating, mounting, etc.) one of the backing storage domains to a host computer. The restoration module may be run on the host computer. In an implementation, the host computer may be selected randomly from any of the host computers from the secondary site, or from a host computer used for centralized management of the virtualized environment. In one example, referring back to FIG. 1, the host computer 115, which is used for centralized management of the virtualized environment, may be selected for attaching to a backing storage domain. In another example, one of the host computers (e.g., 120C, or 120D, etc.) of the data center 140B may be selected for attaching to a backing storage domain. Restoration module 117 may run on the selected host computer.

In an implementation, one of the backing storage domains 160D-160F may be randomly selected to be attached to the selected host computer. In the implementation where metadata 230 resides on each of the backing storage domains 160D-160F, attaching a host computer to any of the backing storage domains may allow the restoration module to gain access to metadata 230 for prioritization of execution of HA VMs. In an example, backing storage domain 160D may be attached to host 115 and restoration module 117 running on host 115 can access metadata 230 stored on storage domain 160D.

Figure 3A:
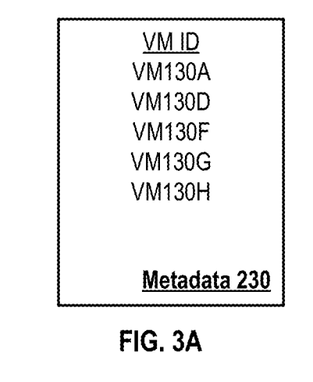
FIGS. 3A-3F depict example of using metadata to prioritize execution of highly available virtual machines, according to one or more aspects of the disclosure.

In some implementations, the restoration process may involve accessing metadata that identifies a plurality of VMs that are indicated as highly available VMs. For example, restoration module 117 may access (e.g., read, examine, etc.) metadata 230 which identifies a plurality of VMs 130A, 130D, 130F, 130G, and 130H indicated as HA VMs, as depicted in FIG. 3A. These may be the virtual machines that were designated as HA VMs in data center 140A in the primary site prior to the need for restoration arose (e.g., disaster, loss of connection to storage domains, etc.).

In an implementation, the restoration module may identify storage domains associated with each of the HA VMs included in metadata 230. For example, FIG. 3A shows an example of metadata 230 that includes identifiers (e.g., "VM ID") for a plurality of VMs (e.g., VM 130A, 130D, 130F, 130G, and 130H) indicated as HA VMs. Using data included in management information 220 regarding relationships between virtual machines and storage domains, the restoration module may identify storage domains that are associated with each of the HA VMs included in metadata 230. This can reduce redundancy of the same data being included in management information 220 and metadata 230.

Figure 3B:
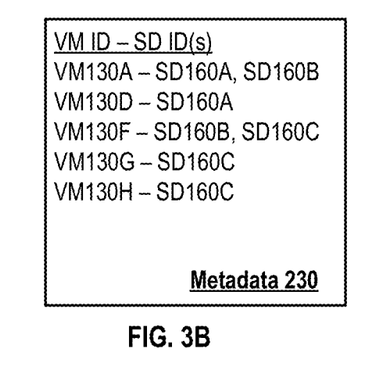

In another example, FIG. 3B shows an example metadata 230 that includes identifiers for HA VMs and for each HA VM, identifier (e.g., "SD ID") and/or location for one or more storage domains that are associated with the HA VM (e.g., virtual machine VM130A associated with storage domain SD160A and SD160B, etc.). For this example, the restoration module may identify storage domains associated with each HA VM by examining metadata 230. Including identifiers of storage domain in metadata 230 may reduce the time it takes to identify the associated storage domains using management information 220.

Figure 3C:
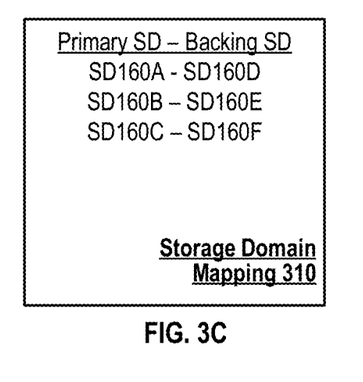

In an implementation, based on the identification of storage domains associated with each HA VM using the metadata, the restoration module may identify one or more HA VMs of the plurality of HA VMs included in the metadata that are associated with each of a plurality of storage domains. That is, using metadata 230, restoration module 117 may identify which of the HA VMs in the metadata are associated with each of the backing storage domains. For example, based on metadata 230 depicted in FIG. 3B, the restoration module 117 may identify that, in the primary site, storage domain 160A is associated with HA VMs 130A and 130D, storage domain 160B is associated with HA VMs 130A and 130F, and storage domain 160C is associated with HA VMs 130F, 130G, and 130H. As described with reference to FIG. 1, there may be a one to one mapping between the storage domains in the primary site and the storage domains in the secondary site. For example, storage domain mapping 310 in FIG. 3C shows the mapping between the storage domains in the primary site and secondary site. In an example, primary storage domain SD160A is mapped to backing storage domain SD160D, SD 160B is mapped to SD160E, and SD160C is mapped to SD160F. Using the mapping, the restoration module may identify that, in the secondary site, backing storage domain 160D (e.g., backing storage domain for 160A) is associated with HA VMs 130A and 130D, storage domain 160E is associated with HA VMs 130A and 130F, and storage domain 160F is associated with HA VMs 130F, 130G, and 130H.

Figure 3D:
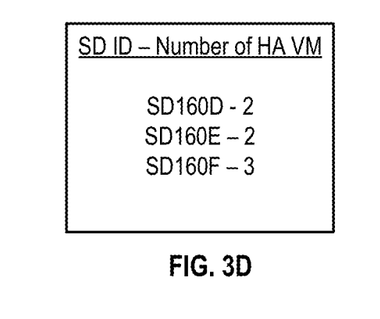
Figure 3E:
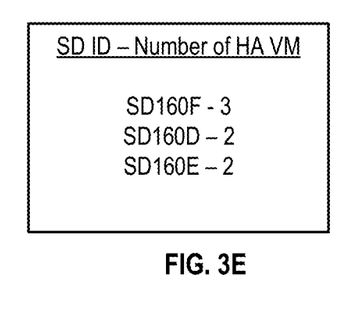

In some implementations, based on the metadata, the restoration module may determine a number of HA VMs that are associated with each storage domain of the plurality of storage domains. In an implementation, using metadata 230, the restoration module may determine the number of HA VMs associated with each storage domain of the plurality of backing storage domains 160D-160F. For example, as depicted in FIG. 3D, restoration module 117 may determine that two HA VMs (e.g., HA VMs 130A and 130D) are associated with backing storage domain SD160D, two HA VMs associated with SD160E and three HA VMs associated with SD160F.

In some implementations, the restoration module may identify a storage domain for attaching to a host for registering and restoring the virtual machines into the data center on the secondary site. The restoration module may prioritize some storage domains over other ones based on various factors. In some examples, the restoration module may identify an order for attaching the storage domains to the hosts such that the storage domain with highest priority is selected to be attached to the hosts first. For example, a storage domain with the maximum number of HA VMs may be prioritized and selected first to initiate the execution of the maximum number of HA VMs in the secondary site. In some implementations, the restoration module may sort the plurality of storage domains according to a descending order of the number of HA VMs associated with each storage domain. For example, restoration module 117 may sort the plurality of backing storage domains 160D-160F in a descending order of the number of HA VMs (e.g., highest number of HA VMs to lowest number of HA VMs) associated with each of the backing storage domains. The sorting of the plurality of backing storage domains may result into a sorted plurality of storage domains, such as that depicted in FIG. 3E.

In some implementations, the restoration module may initiate execution of the one or more HA VMs associated with each of the sorted plurality of storage domains in a sequential manner, starting with a storage domain associated with a highest number of HA VMs. That is, in one implementation, the restoration module may sequentially iterate through the sorted plurality of storage domains according to the descending order of the number of HA VMs, starting with the storage domain associated with the highest number of HA VMs, and select the current storage domain for attaching to a host for registering and restoring the virtual machines into the data center on the secondary site. For example, restoration module 117 may sequentially iterate through sorted plurality of storage domains SD160F, 160D, and 160E, starting with the storage domain SD160F, which is associated with the highest number of HA VMs (e.g, three HA VMs). In an implementation, for each of the sorted plurality of storage domains, the restoration module may attach (e.g., associate) the selected storage domain to all of the available hosts in the data center. For example, restoration module 117 may attach SD160F to each of the available hosts 120C, 120D, and 120E (depicted in FIG. 1).

In an implementation, for each of the one or more HA VMs associated with the selected storage domain, the restoration module may register the VM template that the VM is based on. If the particular VM template was already registered during the restoration process, the restoration module may skip registration of the particular VM template. The restoration module may then register the one or more HA VMs. The restoration module may then initiate execution of the one or more HA VMs associated with the selected storage domain.

Figure 3F:
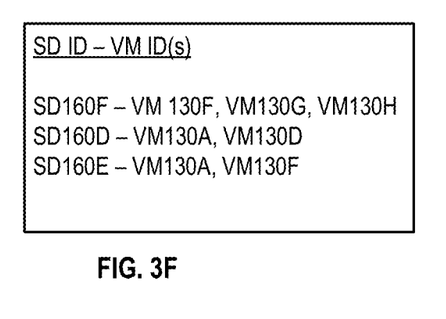

For example, as depicted in FIG. 3F, for each of the HA VMs 130F, 130G, and 130H associated with storage domain SD160F, restoration module 117 may register the VM template that each HA VM is based on, register the HA VM, and initiate execution (e.g., running) of the HA VM. As shown in FIG. 1, virtual machines 130F, 130G, and 130H, are referred to as virtual machines 130O, 130N, and 130P, respectively, when the virtual machines are restored and executed on data center 140B.

Next, restoration module may advance sequentially to the next storage domain in the sorted plurality of storage domains and attach the next storage domain to the available hosts, register templates for the HA VMs associated with the storage domain, register the HA VMs, and initiate execution on the HA VMs. The restoration module may continue the process until execution of all HA VMs is initiated. As such, the restoration module initiates execution of the one or more HA VMs associated with each of the sorted plurality of storage domains in a sequential manner, starting with the storage domain SD160F having the highest number of HA VMs (e.g., three HA VMs).

The restoration process allows for the HA VMs to get executed on a prioritized basis, as the process allows for skipping the steps of attaching each of the other storage domains (SD160D and SD160E) to all of the hosts (120C-120D) and registering other entities, such as templates and non-HA VMs (e.g., VM130J, VM130K, VM130M, etc.) on the selected storage domain as well as all other backing storage domains. The restoration process also reaches the execution of maximum number of HA VMs earlier than the conventional approaches, as the storage domain with the highest number of HA VMs is selected first, and the next highest number of HA VMs, and so on.

In some implementations, subsequent to completing the initiation of execution of the one or more HA VMs associated with each of the plurality of the sorted storage domains, the restoration module may initiate execution of additional virtual machines (e.g., VMs not identified in the metadata) associated with the plurality of storage domains. That is, after execution of all the HA VMs on all the backing storage domains is initiated, the restoration module may register templates for the remaining VMs associated with each of the backing storage domains, register the remaining VMs, and initiate execution of the remaining VMs. For example, after execution of HA VMs 130I, 130L, 130O, 130N, and 130P is initiated, the restoration module may register templates for remaining VMs 130J, 130K, and 130M and register the VMs, and then initiate execution of these VMs.

In an implementation, the plurality of backing storage domains may be sorted using a secondary criteria, after the primary criteria of sorting the storage domains by the number of HA VMs associated with each storage domain. The secondary criteria may involve prioritizing VMs with less associated storage domains. That is, a VM is associated with a storage domain if at least one of the disks of the VM resides in the storage domain. In an example, if a VM has three disks, two disks on a first storage domain and one disk on a second storage domain, then the VM is associated with two storage domains, the first and the second storage domains. When iterating through the plurality of storage domains based on the number of HA VMs associated with them, if it is determined that the first storage domain and the second storage domain both are associated with the same number of HA VMs, then the storage domain whose HA VMs are associated with less total number of storage domains than the other storage domain is selected to be attached to a host for VM restoration. As such, for a subset of storage domains of the sorted plurality of the storage domains wherein each storage domain of the subset of storage domains are associated with the same number of HA VMs, the restoration module may sort the subset of storage domains according to an ascending number of storage domains associated with a set of HA VMs that are associated with each storage domain of the subset of storage domains. The restoration module may then process the storage domain associated with HA VMs with the less associated storage domains first for initiating execution of the HA VMs.

Figure 4:
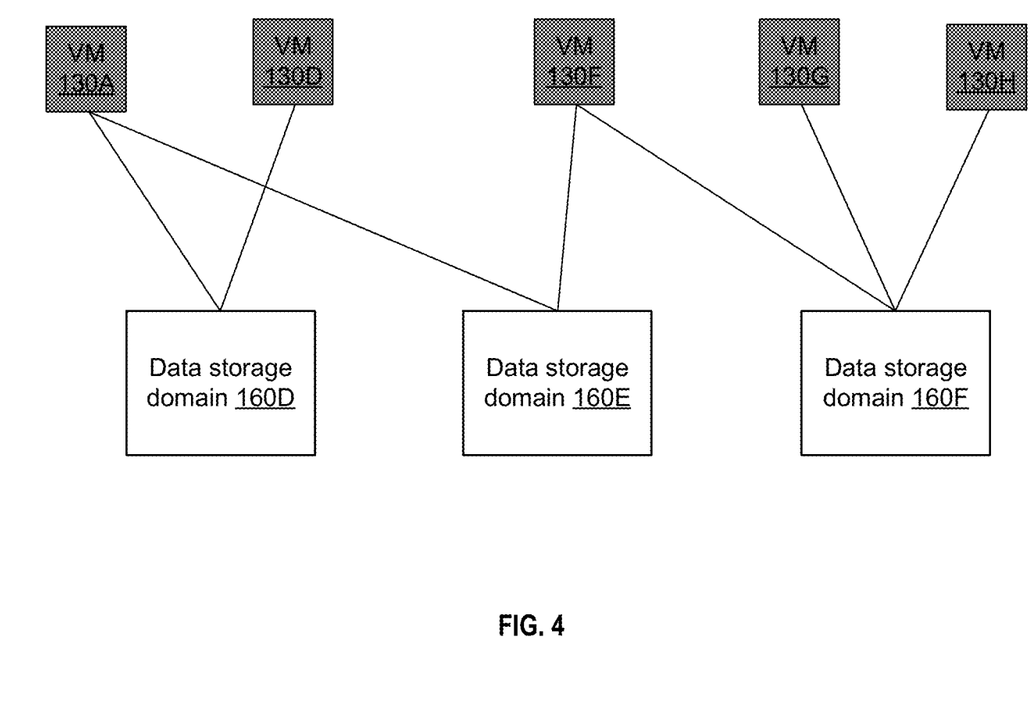
FIG. 4 depicts relationships between storage domains and highly available virtual machines, according to one or more aspects of the disclosure.

For example, as depicted in FIG. 3F and FIG. 4, a subset of backing storage domain, SD160D and SD160E of SD160D-160F, may both be associated with the same number of HA VMs, that is, each associated with two HA VMs. Storage domain SD 160D is associated with VM 130A and 130D. The number of storage domains associated with the set of HA VMs 130A and 130D associated with the storage domain SD160D is two, SD160D and SD160E, because HA VM 130A is associated with storage domains SD160D and SD160E, VM 130D is associated with SD160D. Storage domain SD160E is associated with VM 130A and 130F. The number of storage domains associated with the set of HA VMs 130A and 130F associated with the storage domain SD160E is three, SD160D, SD160E, and SD160F, because VM 130A is associated with storage domains SD160D and SD160E, VM 130D is associated with SD160D, and VM130F is associated with SD160E and SD160F. Thus, the subset of storage domains SD160D and SD160E may be sorted according to an ascending number of storage domains (e.g., lowest to highest) associated with the HA VMs associated with each of the storage domains. The sorting results into the order of SD160D (two storage domains associated with its HA VMs) followed by SD160E (three storage domains associated with its HA VMs). The restoration module may then select SD160D to be processed for the restoration, where SD160D may be attached to the available hosts 120C-E, the templates for its HA VMs may be registered, its HA VMs 130A (referred to as 130I in data center 140B) and 130D (referred to as 130L in data center 140B), and execution of the HA VMs may be initiated. The rationale behind using the secondary sorting criteria is that the less storage domains that are needed to be attached before starting the execution of the HA VM, the faster the HA VM may be able to start executing.

In some implementations, the restoration module may identify the prioritization of the storage domain for attaching to the hosts using one or more attributes assigned to each of the plurality of storage domains. For example, an order of the plurality of storage domains maybe identified for sequential attachment to hosts and execution of VMs using the assigned attributes. As an example, each of the plurality of storage domains may be assigned with a predefined property indicating a characteristic attribute associated with it. The attribute may include, but not be limited to, latency, level of priority, etc. associated with the storage domain. In an implementation, the restoration module may calculate a score for each storage domain based on the attributes, and optionally, other factors. For example, an overall score for a storage domain may be calculated using a first weight (e.g., 40%) based on the number of HA VMs associated with the storage domain, and a second weight (e.g., 60%) based on the predefined property (e.g., latency). In some implementations, other algorithms (e.g., traversing a graph) may be used to identify priority of the storage domains for attaching the hosts and initiating execution of the HA VMs to minimize downtime of HA VMs.

In some implementations, instead of sequentially iterating through the storage domains according to the number of HA VMs associated with each storage domain, each of the storage domains can be attached to the available hosts at the same time and the restoration steps can be performed in parallel for each storage domain to initiate execution of the HA VMs associated with the storage domains. In another implementation, while the registration of entities for the HA VM are being performed during the restoration process, the next storage domain may be attached to available hosts at the same time (e.g., in parallel). Performing the steps in parallel may provide for increased speed and efficiency of the restoration process to start executing the HA VMs as soon as possible after starting the restoration process.

In some implementations, metadata 230 may be used to identify any critical virtual machine that may need to be started immediately upon restoration process starts. That is, instead of identifying the HA VMs in metadata 230, another criteria may be used to identify a list of VMs that need to be prioritized over another set of VMs. Various properties of a VM may be used to derive the list of critical VMs included in the metadata.

In some implementation, the metadata 230 may be stored in a particular storage domain as opposed to storing metadata 230 in each of the backing storage domains, in order to avoid duplication of data across storage domains. The particular storage domain may be flagged in the system 100 and when attaching a host to a storage domain to access the metadata initially for the restoration process, the host may be attached to the particular storage domain. The particular storage domain may be flagged in a data store, such as data store 114. In some implementation, metadata 230 may be stored outside of the storage domains, for example, in a source separated from the storage domains. For example, the metadata 230 may be stored in data source 114.

Figure 5:
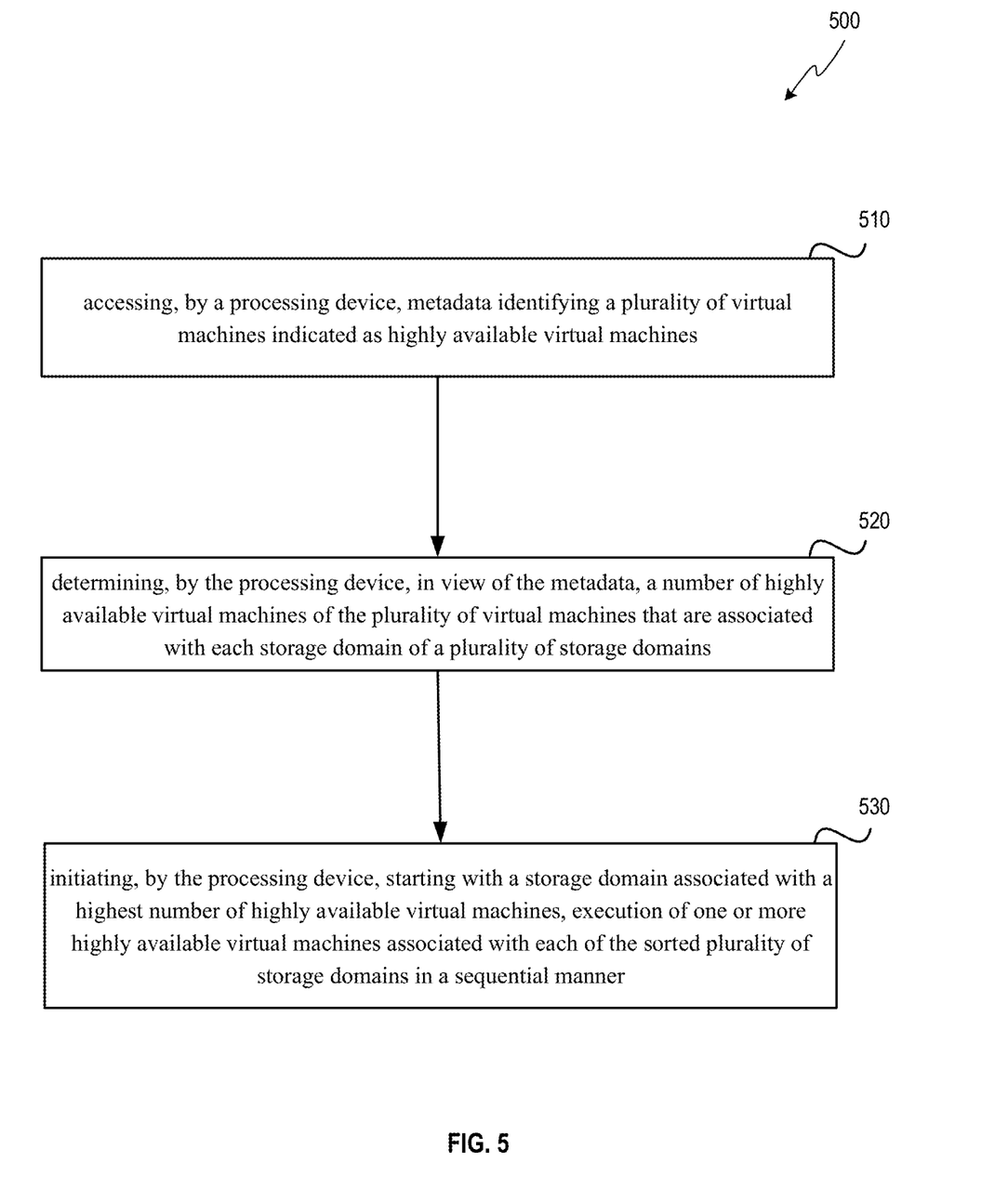
FIG. 5 depicts a flow diagram of an example method for prioritized execution of highly available virtual machines, in accordance with one or more aspects of the disclosure.

FIG. 5 depicts a flow diagram for an illustrative example of method 500 for prioritized execution of highly available virtual machines, in accordance with one or more aspects of the disclosure. Method 500 may be performed by processing devices that may comprise hardware (e.g., circuitry, dedicated logic, programmable logic, microcode, etc.), executable code (such as is run on a general purpose computer system or a dedicated machine), or a combination of both. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, method 500 may be performed by restoration module 117 as shown in FIG. 1.

Referring to FIG. 5, method 500 may be performed by processing devices of a server device or a client device and may begin at block 510. At block 510, a processing device may access metadata identifying a plurality of virtual machines indicated as highly available virtual machines. In one example, the metadata may reside on each storage domain of the plurality of storage domains. In another example, the metadata may reside on a particular storage domain of the plurality of storage domains. In yet another example, the metadata may reside on a source separated from the plurality of storage domains. In some examples, the metadata may comprise an identifier for each of the plurality of virtual machines. In some examples, the metadata may identify that one or more storage domains of the plurality of storage domains is associated with each of the plurality of virtual machines. In some implementations, the metadata is updated after a change is detected in a computing system comprising the plurality of virtual machines.

At block 520, the processing device may determine, in view of the metadata, a number of highly available virtual machines of the plurality of virtual machines that are associated with each storage domain of a plurality of storage domains. For example, the processing device may determine the number of highly available virtual machines of the plurality of virtual machines that are associated with one or more storage disks that reside on each storage domain of the plurality of storage domains. At block 530, the processing device may sort the plurality of storage domains according to a descending order of the number of highly available virtual machines associated with each storage domain.

At block 540, the processing device may initiate, starting with a storage domain associated with a highest number of highly available virtual machines, execution of one or more highly available virtual machines associated with each of the sorted plurality of storage domains in a sequential manner. In an example, the sequential manner may involve the processing device to iterate through the plurality of storage domains in the order of SDs associated with the highest number of HA VMs, then the second highest number of HA VMs, and so on, to SDs associated with the lowest number of HA VMs. Furthermore, the processing device may sort the plurality of storage domains according to the number of highly available virtual machines associated with each storage domain. Additionally, for a subset of storage domains of the sorted plurality of the storage domains wherein each storage domain of the subset of storage domains is associated with a same number of highly available virtual machines, the processing device may further sort the subset of storage domains in view of an ascending number of storage domains associated with a set of highly available virtual machines that are associated with each storage domain of the subset of storage domains. Furthermore, subsequent to completing the initiation of execution of the one or more highly available virtual machines associated with each of the plurality of the sorted storage domains, the processing device may initiate execution of one or more additional virtual machines associated with each of the sorted plurality of storage domains.

Figure 6:
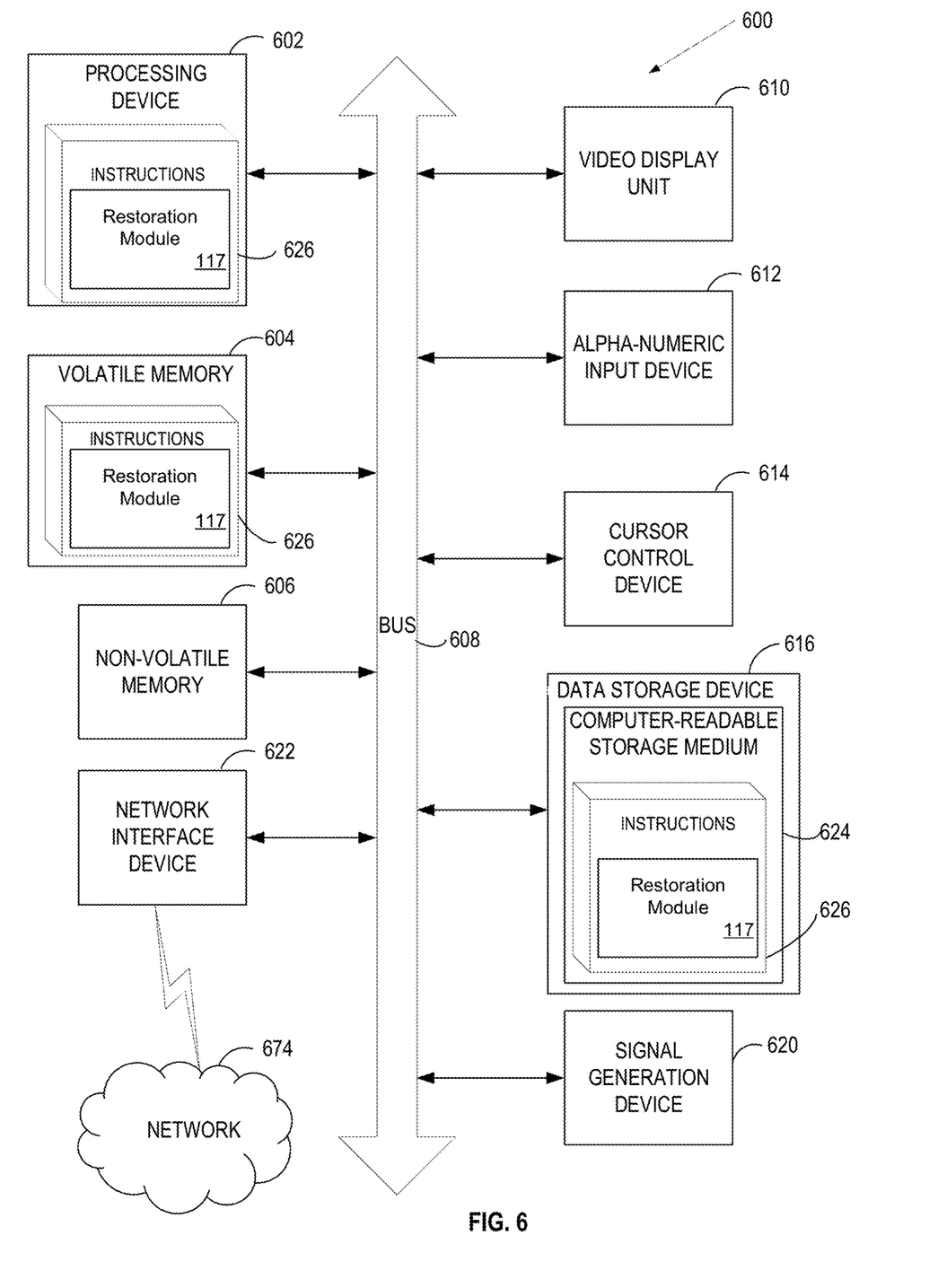
FIG. 6 depicts a block diagram of an illustrative computing device operating in accordance with the examples of the disclosure.

FIG. 6 depicts a block diagram of a computer system operating in accordance with one or more aspects of the disclosure. In various illustrative examples, computer system 600 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 500 for restoration module 117.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "detecting," "verifying," "evicting," "selecting," "restricting," "receiving," "updating," "providing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 500 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the disclosure is not limited to the examples and implementations described. The scope of the disclosure should be determined with reference to the following claims, along with the full scope of equivalents to which the claims are entitled.

What is claimed is:

1. A method comprising:
accessing, by a processing device, metadata identifying a plurality of virtual machines indicated as highly available virtual machines;
determining, by the processing device, in view of the metadata, a number of highly available virtual machines of the plurality of virtual machines that are associated with each storage domain of a plurality of storage domains;
sorting the plurality of storage domains according to the number of highly available virtual machines associated with each storage domain; and
initiating, by the processing device, starting with a storage domain associated with a highest number of highly available virtual machines, execution of one or more highly available virtual machines associated with each of the sorted plurality of storage domains in a sequential manner.

2. The method of claim 1, wherein initiating execution of the one or more highly available virtual machines in the sequential manner comprises:
initiating the execution of the one or more highly available virtual machines associated with each of the sorted plurality of storage domains by iterating through the sorted plurality of storage domains in an order of the storage domain associated with the highest number of highly available virtual machines to another storage domain associated with a lowest number of highly available virtual machine.

3. The method of claim 1, wherein the metadata resides on each storage domain of the plurality of storage domains.

4. The method of claim 1, wherein the metadata resides on a particular storage domain of the plurality of storage domains.

5. The method of claim 1, wherein the metadata resides on a source separate from the plurality of storage domains.

6. The method of claim 1, wherein the metadata comprises an identifier for each of the plurality of virtual machines.

7. The method of claim 1, wherein the metadata is updated after a change is detected in a computing system comprising the plurality of virtual machines.

8. The method of claim 1, wherein the metadata identifies that one or more storage domains of the plurality of storage domains are associated with each of the plurality of virtual machines.

9. The method of claim 1, further comprising:
determining that each storage domain of a subset of storage domains of the plurality of the storage domains is associated with a same number of highly available virtual machines; and
sorting the subset of storage domains in view of a number of storage domains associated with a set of highly available virtual machines that are associated with each storage domain of the subset of storage domains.

10. The method of claim 1, wherein determining the number of highly available virtual machines of the plurality of virtual machines that are associated with each storage domain of the plurality of storage domains comprises:
determining the number of highly available virtual machines of the plurality of virtual machines that are associated with one or more storage disks that reside on each storage domain of the plurality of storage domains.

11. The method of claim 1, further comprising:
subsequent to completing the initiation of execution of the one or more highly available virtual machines associated with each of the plurality of storage domains, initiating, by the processing device, execution of one or more additional virtual machines associated with each of the sorted plurality of storage domains.

12. A system comprising:
a memory; and
a processing device communicably coupled to the memory to:
access metadata identifying a plurality of virtual machines indicated as highly available virtual machines;
determine, in view of the metadata, a number of highly available virtual machines of the plurality of virtual machines that are associated with each storage domain of a plurality of storage domains;
sort the plurality of storage domains according to the number of highly available virtual machines associated with each storage domain; and
initiate, starting with a storage domain associated with a highest number of highly available virtual machines, execution of one or more highly available virtual machines associated with each of the sorted plurality of storage domains in a sequential manner.

13. The system of claim 12, wherein to determine the number of highly available virtual machines of the plurality of virtual machines that are associated with each storage domain of the plurality of storage domains, the processing device is to:
determine the number of highly available virtual machines of the plurality of virtual machines that are associated with one or more storage disks that reside on each storage domain of the plurality of storage domains.

14. The system of claim 12, wherein the metadata comprises an identifier for each of the plurality of virtual machines.

15. The system of claim 12, wherein the metadata is updated after a change is detected in a computing system comprising the plurality of virtual machines.

16. The system of claim 12, wherein the processing device is further to:
initiate, subsequent to completing the initiation of execution of the one or more highly available virtual machines associated with each of the sorted plurality of the storage domains, execution of one or more additional virtual machines associated with each of the plurality of storage domains.

17. The system of claim 12, wherein to initiate execution of the one or more highly available virtual machines in the sequential manner, the processing device is to:
initiate the execution of the one or more highly available virtual machines associated with each of the sorted plurality of storage domains by iterating through the sorted plurality of storage domains in an order of the storage domain associated with the highest number of highly available virtual machines to another storage domain associated with a lowest number of highly available virtual machine.

18. A non-transitory machine-readable storage medium storing instructions that cause a processing device to:
- access metadata identifying a plurality of virtual machines indicated as highly available virtual machines;
- determine, in view of the metadata, a number of highly available virtual machines of the plurality of virtual machines that are associated with each storage domain of a plurality of storage domains;
- sort the plurality of storage domains according to the number of highly available virtual machines associated with each storage domain; and
- initiate, starting with a storage domain associated with a highest number of highly available virtual machines, execution of one or more highly available virtual machines associated with each of the sorted plurality of storage domains in a sequential manner.

19. The non-transitory machine-readable storage medium of claim 18, wherein the metadata resides on each storage domain of the plurality of storage domains.

20. The non-transitory machine-readable storage medium of claim 18, wherein the metadata resides on a particular storage domain of the plurality of storage domains.

* * * * *